(12) United States Patent
Griffith, Jr.

(10) Patent No.: US 7,350,794 B2
(45) Date of Patent: Apr. 1, 2008

(54) VEHICLE REAR SUSPENSION APPARATUS

(76) Inventor: Weston Griffith, Jr., 15815 West Ave., Harvey, IL (US) 60426

( * ) Notice: Subject to any disclaimer, the term of this patent is extended or adjusted under 35 U.S.C. 154(b) by 447 days.

(21) Appl. No.: 11/109,838

(22) Filed: Apr. 19, 2005

(65) Prior Publication Data

US 2006/0232037 A1    Oct. 19, 2006

(51) Int. Cl.
*B60G 3/12* (2006.01)
(52) U.S. Cl. ............... 280/124.128; 280/124.1; 280/124.116
(58) Field of Classification Search ............ 280/124.1, 280/124.116, 124.128
See application file for complete search history.

(56) References Cited

U.S. PATENT DOCUMENTS 2,080,546 A * 5/1937 Rudoni ............... 267/278
2003/0094780 A1 * 5/2003 Cho ............... 280/124.128

OTHER PUBLICATIONS

Bill Shope, "Cutting corners" -Rear suspension design for chassis loading- p. 80 Jan. 1984.

* cited by examiner

*Primary Examiner*—Ruth Ilan
*Assistant Examiner*—Tiffany L. Webb
(74) *Attorney, Agent, or Firm*—David J. Archer

(57) ABSTRACT

A rear suspension apparatus is disclosed for a high speed vehicle body having a first and a second driven ground engaging wheel. The apparatus includes a first truck arm having a first and a second end. The first end of the first arm is connected to the body of the vehicle at a first fixed location. A second truck arm has a first and a second extremity, the first extremity of the second arm being connected to the body of the vehicle at a second fixed location. A drive axle has a first and a second side, the second end of the first arm being secured adjacent to the first side of the axle. The second extremity of the second arm is secured adjacent to the second side of the axle such that the axle is supported by the arms. The arrangement is such that a first plane extending through the first and second sides of the axle is disposed spaced and parallel relative to a second plane extending through the first and the second locations. The first truck arm is fabricated from a material having a first hardness and the second truck arm is fabricated from a material having a second hardness. The arrangement is such that when the first ground engaging wheel which is drivingly connected to the first side of the axle is driven and the second ground engaging wheel which is drivingly connected to the second side of the axle is driven, a first force tending to increase pressure between the first ground engaging wheel and the ground and a second force tending to decrease pressure between the second ground engaging wheel and the ground is compensated for by a difference in hardness between the first and second hardness of the respective arms. The arrangement is such that when the wheels rotate, a first contact force between the first wheel and the ground substantially equals a second contact force between the second wheel and the ground so that acceleration of the vehicle body is enhanced.

16 Claims, 5 Drawing Sheets

VEHICLE REAR SUSPENSION APPARATUS

BACKGROUND OF THE INVENTION

1. Field of the Invention

The present invention relates to a rear suspension apparatus for a high speed vehicle having a first and a second driven ground engaging wheel.

More specifically, the present invention relates to a non independent rear suspension apparatus for a racing car or dragster having a first and a second driven ground engaging wheel.

2. Background Information

In motor racing, racing cars are designed to achieve the greatest possible rate of acceleration. Often, the difference between winning or losing a race depends on how rapidly the racing car is able to accelerate on a straight section of the racetrack.

With a racing car or dragster having a power source for driving the rear wheels of the vehicle, the power is supplied to the rear wheels by a power train which includes a rear axle having a differential gear assembly. During acceleration on a straight section of the racetrack, power is supplied to an input of the differential gear assembly which is designed to generate an equal rotational force to both of the driven rear wheels.

However, there is also a tendency under acceleration for the whole rear axle to rotate around an axis extending through the input of the differential gear assembly. Such rotational tendency of the rear axle urges a driven first rear wheel towards the ground while tending to lift the second driven wheel away from the ground. Therefore, under these circumstances, the second wheel tends to spin while a lesser rotational force is applied through the differential gear assembly to the first wheel in an attempt to compensate for the wheel slip of the second wheel. Therefore, the full advantage of the available power is not uniformly applied to both wheels for attaining a maximum acceleration of the vehicle.

Although relatively complex limited slip differential gear assemblies have been devised to increase acceleration, such assemblies increase the weight of the rear axle and do not fully compensate for the unequal ground contact force between the respective driven wheels.

The present invention overcomes the aforementioned problem by the provision of truck arms having differential hardness. More specifically, the hardness of the second truck arm which is associated with the second driven wheel is greater than the hardness of the first truck arm associated with the first driven wheel. Accordingly, during acceleration, the tendency for the second wheel to lift is restrained because the second truck arm is of harder and therefore less resilient steel.

Accordingly, in the arrangement according to the present invention, when the second wheel and tire thereon tends to lift upwardly away from the track, such upward movement is resisted by the increased hardness and lesser resilience of the associated second arm. Consequently, the rotational force applied by the differential gear assembly through the second drive shaft applies a rotational force to the second wheel for applying an acceleration to the second wheel which is fully utilized by the maintained ground contact of the second wheel while an equal rotational force is at the same time applied to the first wheel.

Additionally, by compensating in the aforementioned manner by fabricating the arms of different hardness steels, such arrangement does not interfere with the application by the differential gear assembly of differential power to the respective wheels during cornering.

Therefore, it is a primary feature of the present invention to provide a rear suspension apparatus that overcomes the problems associated with the prior art arrangements.

Another feature of the present invention is the provision of a rear suspension apparatus that enhances the acceleration of the vehicle.

Other features and advantages of the present invention will be readily apparent to those skilled in the art by a consideration of the detailed description of a preferred embodiment of the present invention contained herein.

SUMMARY OF THE INVENTION

The present invention relates to a rear suspension apparatus for a high speed vehicle body having a first and a second driven ground engaging wheel. The apparatus includes a first truck arm having a first and a second end. The first end of the first arm is connected to the body of the vehicle at a first fixed location. A second truck arm has a first and a second extremity, the first extremity of the second arm being connected to the body of the vehicle at a second fixed location. A drive axle has a first and a second side, the second end of the first arm being secured adjacent to the first side of the axle. The second extremity of the second arm is secured adjacent to the second side of the axle such that the axle is supported by the arms. The arrangement is such that a first plane extending through the first and second sides of the axle is disposed spaced and parallel relative to a second plane extending through the first and the second locations. The first truck arm is fabricated from a material having a first hardness and the second truck arm is fabricated from a material having a second hardness. The arrangement is such that when the first ground engaging wheel which is drivingly connected to the first side of the axle is driven and the second ground engaging wheel which is drivingly connected to the second side of the axle is driven, a first force tending to increase pressure between the first ground engaging wheel and the ground and a second force tending to decrease pressure between the second ground engaging wheel and the ground is compensated for by a difference in hardness between the first and second hardness of the respective arms. The arrangement is such that when the wheels rotate, a first contact force between the first wheel and the ground substantially equals a second contact force between the second wheel and the ground so that acceleration of the vehicle body is enhanced.

In a more specific embodiment of the present invention, the first end of the first arm includes a first spherical bearing for coupling the first end of the first arm to the first location on the high speed vehicle body.

Also, the first extremity of the second arm includes a second spherical bearing for coupling the first extremity of the second arm to the second location on the high speed vehicle body.

In an alternative embodiment of the present invention, the first end of the first arm includes a first resiliently mounted bushed bearing for coupling the first end of the first arm to the first location on the high speed vehicle body.

Additionally, the first extremity of the second arm includes a second resiliently mounted bushed bearing for coupling the first extremity of the second arm to the second location on the high speed vehicle body.

The high speed vehicle body includes a frame which is secured at the first and second locations to the first end and first extremity respectively of the first and second arms respectively.

Moreover, the drive axle includes an axle casing and a differential gear assembly which is disposed between the first and the second sides of the drive axle. A first and a second drive shaft extend from the differential gear assembly to the first and second wheels respectively.

The first truck arm includes a first anchor which is disposed adjacent to the second end of the first arm for securing the second end of the first truck arm to the first side of the drive axle.

A second anchor is disposed adjacent to the second extremity of the second arm for securing the second extremity of the second truck arm to the second side of the drive axle.

Furthermore, a first spring mounting is disposed between the first anchor and the first end of the first arm and a second spring mounting is disposed between the second anchor and the first extremity of the second arm.

A first shock absorber bracket is disposed adjacent to the first anchor and a second shock absorber bracket is disposed adjacent to the second anchor.

More specifically, a first spring extends between the first spring mounting and the vehicle body and a second spring extends between the second spring mounting and the vehicle body.

Also, a first shock absorber extends between the first shock absorber bracket and the vehicle body and a second shock absorber extends between the second shock absorber bracket and the vehicle body.

More particularly, the truck arms are fabricated from steel.

Additionally, the first truck arm is fabricated from steel having a first hardness within a first range 60 to 85 on the Rockwell hardness B-scale and the second truck arm is fabricated from steel having a second hardness within a second range 86 to 110 on the Rockwell hardness B-scale.

The second hardness is greater than the first hardness so that the second truck arm has greater rigidity than the first truck arm. The arrangement is such that during acceleration, the greater rigidity of the second arm counteracts the second force tending to decrease pressure between the second wheel and the ground so that the second contact force between the second wheel and the ground during acceleration substantially equals the first contact force between the first wheel and the ground. The arrangement is such that when the wheels rotate during acceleration, such rotation of the wheels equally propels both sides of the drive axle relative to the ground thereby enhancing acceleration of the vehicle body.

Moreover, the second hardness is different from the first hardness so that the second truck arm has a second rigidity which is different from a first rigidity of the first truck arm. By this means, during acceleration, the second rigidity of the second arm counteracts the second force tending to decrease pressure between the second wheel and the ground so that the second contact force between the second wheel and the ground during acceleration substantially equals the first contact force between the first wheel and the ground. The arrangement is such that when the wheels rotate during acceleration, such rotation of the wheels equally propels both sides of the drive axle relative to the ground thereby enhancing acceleration of the vehicle body.

Many modifications and variations of the present invention will be readily apparent to those skilled in the art by a consideration of the detailed description contained hereinafter taken in conjunction with the annexed drawings which show a preferred embodiment of the present invention. However, such modifications and variations fall within the spirit and scope of the present invention as defined by the appended claims.

BRIEF DESCRIPTION OF THE DRAWINGS

Similar reference characters refer to similar parts throughout the various views and embodiments of the drawings.

DETAILED DESCRIPTION OF THE DRAWINGS

Figure 1:
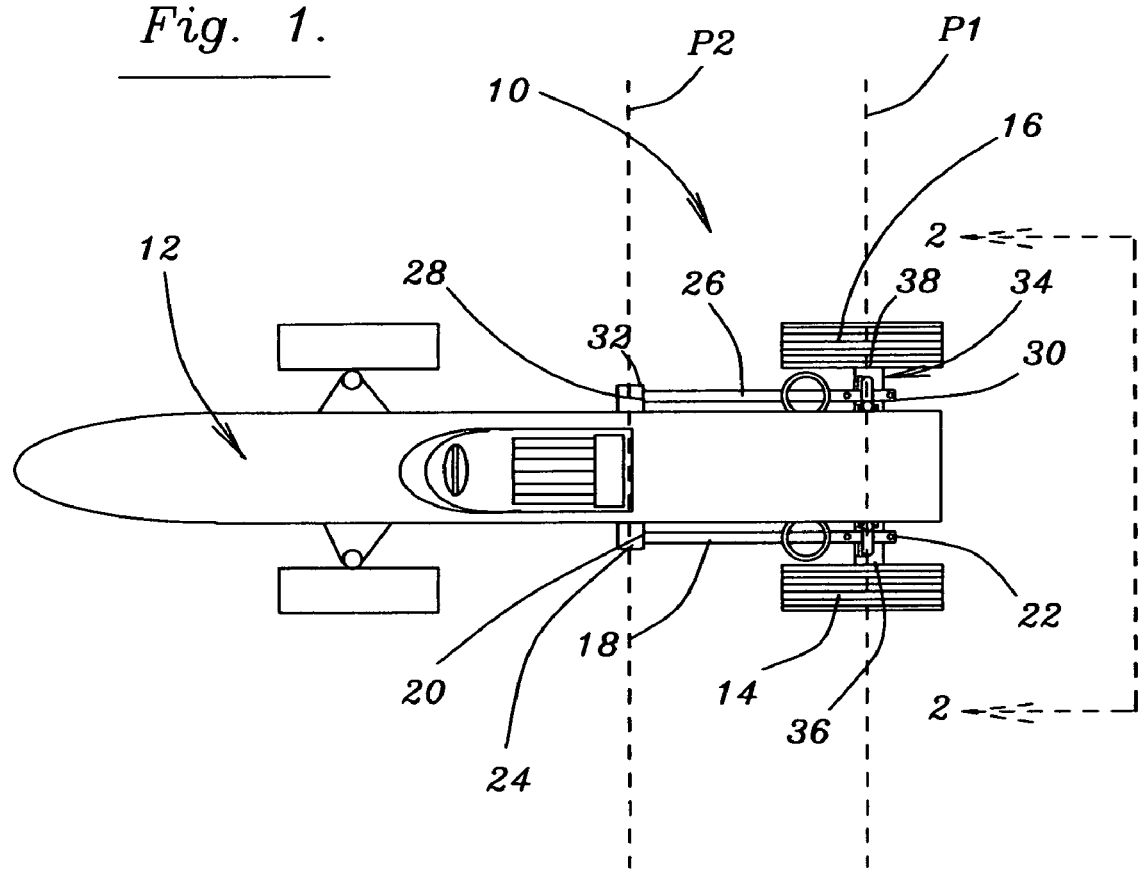
FIG. 1 is a top plan view of a rear suspension apparatus according to the present invention for a high speed vehicle body having a first and a second driven ground engaging wheel.

FIG. 1 is a top plan view of a rear suspension apparatus generally designated 10 for a high speed vehicle body 12 having a first and a second driven ground engaging wheel 14 and 16 respectively. As shown in FIG. 1, the apparatus 10 includes a first truck arm 18 having a first and a second end 20 and 22 respectively. The first end 20 of the first arm 18 is connected to the body of the vehicle 12 at a first fixed location 24. A second truck arm 26 has a first and a second extremity 28 and 30 respectively, the first extremity 28 of the second arm 26 being connected to the body of the vehicle 12 at a second fixed location 32. A drive axle generally designated 34 has a first and a second side 36 and 38 respectively. The second end 22 of the first arm 18 is secured adjacent to the first side 36 of the axle 34. The second extremity 30 of the second arm 26 is secured adjacent to the second side 38 of the axle 34 such that the axle 34 is supported by the arms 18 and 26. The arrangement is such that a first plane P1 extending through the first and second sides 36 and 38 respectively of the axle 34 is disposed spaced and parallel relative to a second plane P2 extending through the first and the second locations 24 and 32 respectively.

Figure 2:
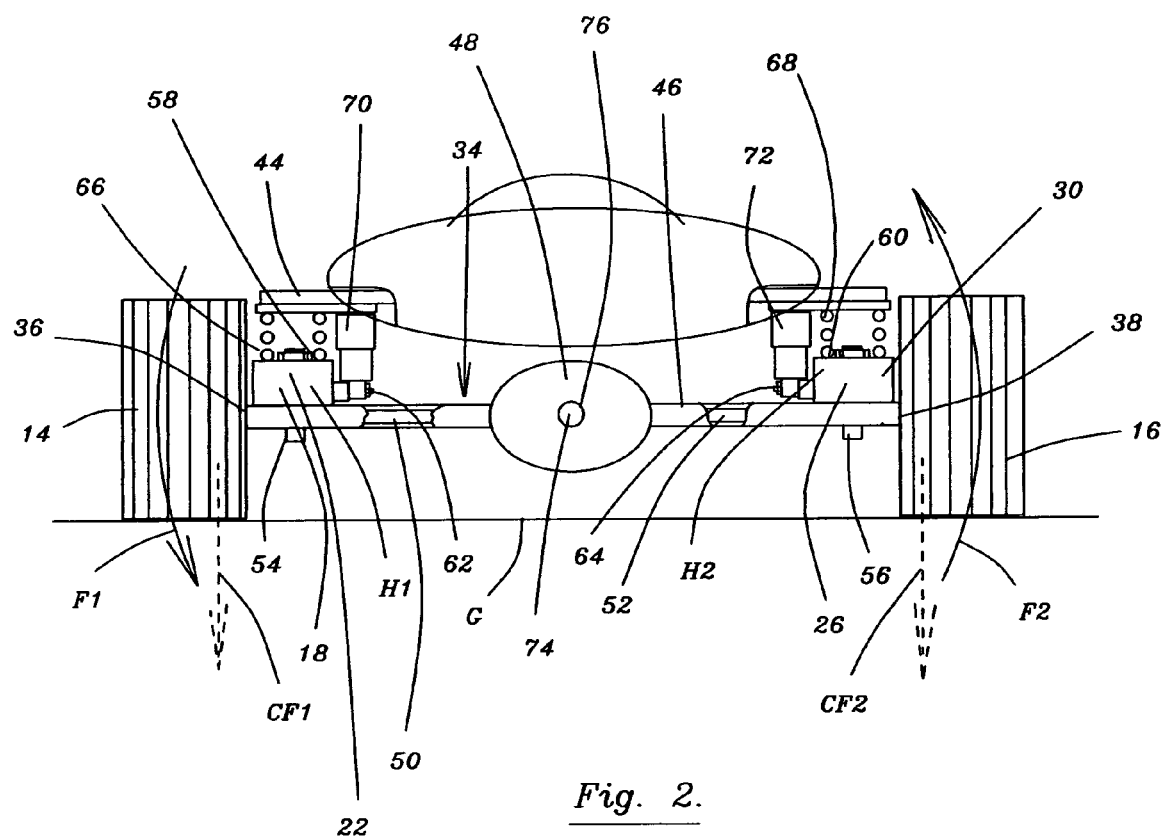
FIG. 2 is an enlarged view taken on the line 2-2 of FIG. 1.

FIG. 2 is an enlarged view taken on the line 2-2 of FIG. 1. As shown in FIG. 2, the first truck arm 18 is fabricated from a material having a first hardness H1 and the second truck arm 26 is fabricated from a material having a second hardness H2. The arrangement is such that when the first ground engaging wheel 14 which is drivingly connected to the first side 36 of the axle 34 is driven and the second ground engaging wheel 16 which is drivingly connected to the second side 38 of the axle 34 is driven, a first force as indicated by the arrow F1 tending to increase pressure between the first ground engaging wheel 14 and the ground G and a second force as indicated by the arrow F2 tending to decrease pressure between the second ground engaging wheel 16 and the ground G is compensated for by a difference in hardness between the first and second hardness H1 and H2 respectively of the respective arms 18 and 26. The arrangement is such that when the wheels 14 and 16 rotate, a first contact force as indicated by the arrow CF1 between the first wheel 14 and the ground G substantially equals a second contact force as indicated by the arrow CF2 between the second wheel 16 and the ground G so that acceleration of the vehicle body 12 is enhanced.

Figure 3:
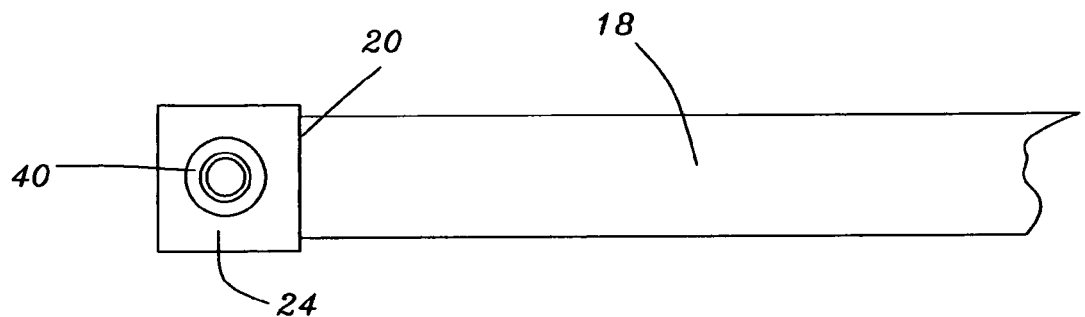
FIG. 3 is an enlarged side elevational view of the first end of the first arm.

FIG. 3 is an enlarged side elevational view of the first end 20 of the first arm 18. As shown in FIG. 3, the first end 20 of the first arm 18 includes a first spherical bearing 40 for coupling the first end 20 of the first arm 18 to the first location 24 on the high speed vehicle body 12.

Figure 4:
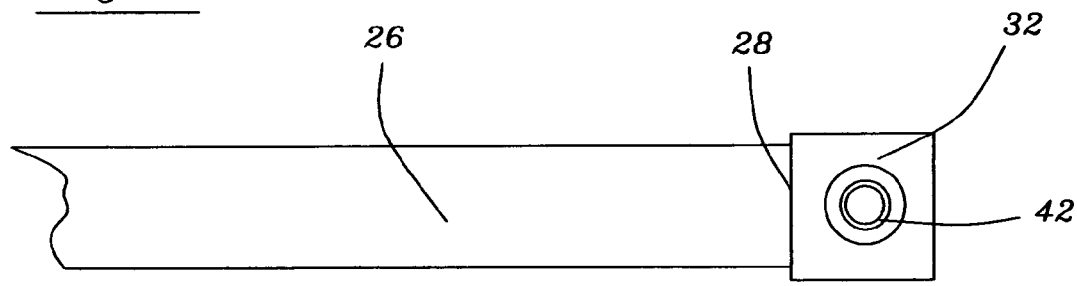
FIG. 4 is an enlarged side elevational view of the first extremity of the second arm.

FIG. 4 is an enlarged side elevational view of the first extremity 28 of the second arm 26. As shown in FIG. 4, the first extremity 28 of the second arm 26 includes a second spherical bearing 42 for coupling the first extremity 28 of the second arm 26 to the second location 32 on the high speed vehicle body 12.

Figure 5:
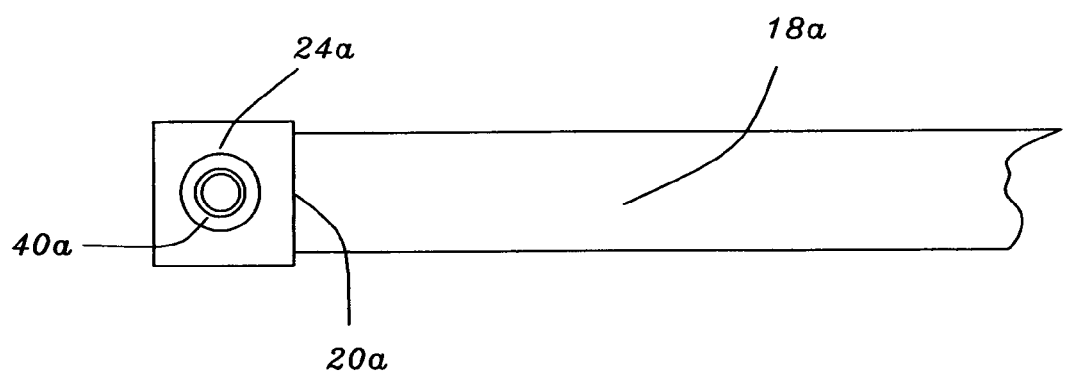
FIG. 5 is a similar view to that shown in FIG. 3 but shows an alternative embodiment of the present invention.

FIG. 5 is a similar view to that shown in FIG. 3 but shows an alternative embodiment of the present invention. As shown in FIG. 5, the first end 20a of the first arm 18a includes a first resiliently mounted bushed bearing 40a for coupling the first end 20a of the first arm 18a to the first location 24a on the high speed vehicle body.

Figure 6:
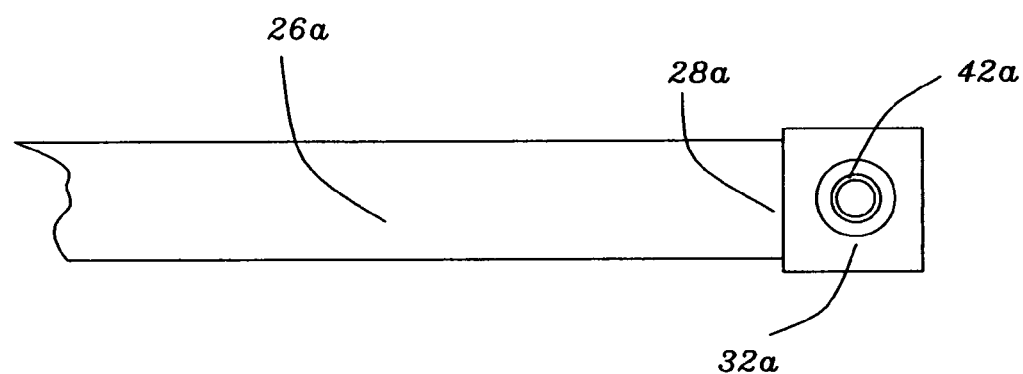
FIG. 6 is a similar view to that shown in FIG. 4 but shows the alternative embodiment of the present invention.

FIG. 6 is a similar view to that shown in FIG. 4 but shows the alternative embodiment of the present invention. As shown in FIG. 6, the first extremity 28a of the second arm 26a includes a second resiliently mounted bushed bearing 42a for coupling the first extremity 28a of the second arm 26a to the second location 32a on the high speed vehicle body.

In both embodiments of the present invention, the high speed vehicle body 12 includes a frame 44 which is secured at the first and second locations 24 and 32 to the first end 20 and first extremity 28 respectively of the first and second arms 18 and 26 respectively.

Moreover, as shown in FIG. 2, the drive axle 34 includes an axle casing 46 and a differential gear assembly 48 which is disposed between the first and the second sides 36 and 38 respectively of the drive axle 34. A first and a second drive shaft 50 and 52 respectively extend from the differential gear assembly 48 to the first and second wheels 14 and 16 respectively.

As shown in FIG. 2, the first truck arm 18 includes a first anchor 54 which is disposed adjacent to the second end 22 of the first arm 18 for securing the second end 22 of the first truck arm 18 to the first side 36 of the drive axle 34.

A second anchor 56 is disposed adjacent to the second extremity 30 of the second arm 26 for securing the second extremity 30 of the second truck arm 26 to the second side 38 of the drive axle 34.

Furthermore, a first spring mounting 58 is disposed between the first anchor 54 and the first end 20 of the first arm 18 and a second spring mounting 60 is disposed between the second anchor 56 and the first extremity 28 of the second arm 26.

A first shock absorber bracket 62 is disposed adjacent to the first anchor 54 and a second shock absorber bracket 64 is disposed adjacent to the second anchor 56.

More specifically, a first spring 66 extends between the first spring mounting 58 and the vehicle body 12 and a second spring 68 extends between the second spring mounting 60 and the vehicle body 12.

Also, a first shock absorber 70 extends between the first shock absorber bracket 62 and the vehicle body 12 and a second shock absorber 72 extends between the second shock absorber bracket 64 and the vehicle body 12.

More particularly, the truck arms 18 and 26 are fabricated from steel.

Additionally, the first truck arm 18 is fabricated from steel having a first hardness H1 within first range 60 to 85 on the Rockwell hardness B-scale and the second truck arm 26 is fabricated from steel having a second hardness H2 within a second range 86 to 110 on the Rockwell hardness B-scale.

The second hardness H2 is greater than the first hardness H1 so that the second truck arm 26 has greater rigidity than the first truck arm 18. The arrangement is such that during acceleration, the greater rigidity of the second arm 26 counteracts the second force F2 tending to decrease pressure between the second wheel 16 and the ground G so that the second contact force CF2 between the second wheel 16 and the ground G during acceleration substantially equals the first contact force CF1 between the first wheel 14 and the ground G. The arrangement is such that when the wheels 14 and 16 rotate during acceleration, such rotation of the wheels 14 and 16 equally propels both sides 36 and 38 respectively of the drive axle 34 relative to the ground G thereby enhancing acceleration of the vehicle body 12.

Figure 7:
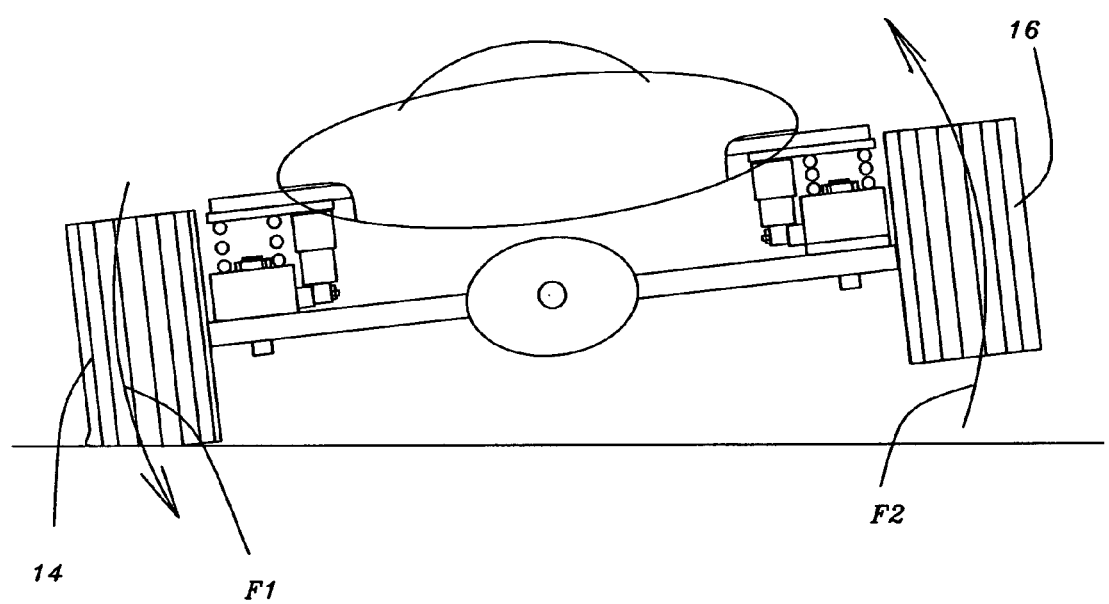
FIG. 7 is a similar view to that shown in FIG. 2 but shows what happens when both arms are made of steel having the same hardness.

FIG. 7 is a similar view to that shown in FIG. 2 but shows what happens when both arms 18 and 26 are made of steel having the same hardness. As shown in FIG. 7, during acceleration, the force F2 tends to lift the second wheel 16 from the ground G because the second arm as shown tends to flex upwardly in response to the force F2.

By the provision of the differential harness of the arms 18 and 26 according to the present invention, as shown in FIG. 2, the second hardness H2 is different from the first hardness H1 so that the second truck arm 26 has a second rigidity R2 which is different from a first rigidity R1 of the first truck arm 18. By this means, during acceleration, the second rigidity R2 of the second arm 26 counteracts the second force F2 tending to decrease pressure between the second wheel 16 and the ground G so that the second contact force CF2 between the second wheel 16 and the ground G during acceleration substantially equals the first contact force CF1 between the first wheel 14 and the ground G. The arrangement is such that when the wheels 14 and 16 rotate during acceleration, such rotation of the wheels 14 and 16 equally propels both sides 36 and 38 of the drive axle 34 relative to the ground G thereby enhancing acceleration of the vehicle body 12.

In operation of the apparatus according to the present invention, the power is supplied to the rear wheels 14 and 16 by a power train which includes the rear axle 34 having the differential gear assembly 48 as shown in FIG. 2. During acceleration on a straight section of the racetrack, power is supplied to the differential gear assembly 48 which is designed to generate an equal rotational force to both of the driven rear wheels 14 and 16.

However, there is also a tendency under acceleration for the whole rear axle 34 to rotate around an axis 74 extending through the input 76 of the differential gear assembly 48. Such rotational tendency as illustrated by the arrows F1 and F2 tend to urge the driven first rear wheel 14 towards the ground G while tending to lift the second driven wheel 16 away from the ground G as particularly shown in FIG. 7. Therefore, under these circumstances, the second wheel 16 as shown in FIG. 7 will spin while a lesser rotational force is applied through the differential gear assembly 48 to the first wheel 14 in an attempt to compensate for the wheel slip of the second wheel 16 as shown in FIG. 7. Therefore, the full advantage of the available power is not uniformly applied to both wheels 14 and 16 for attaining a maximum acceleration of the vehicle.

By the provision of an arm 26 fabricated from steel having a greater hardness H2 than the hardness H1 of arm 18, the arm 26 is less flexible than arm 18. Consequently, the more rigid arm 26 counteracts any tendency for the second arm 26 to flex upwardly in response to the applied force F2 during acceleration. Thus, the second wheel 16 as shown in FIG. 2 during acceleration remains in contact with the ground G due to the greater rigidity of the second arm 26 so that the full benefit of the rotational power applied through the differential gear assembly to both the wheels 14 and 16 is fully utilized for increasing the acceleration rate of the vehicle.

In a preferred embodiment of the present invention, the arm 26 is of chrome/molybdenum 30 carbon steel. More specifically, arm 26 is fabricated from 4130 grade steel. Such steel has 30×1/100 of 1% carbon. However, the arm 18 is fabricated from a low carbon steel which is a 1006, 1008 or 1010 grade steel.

Also, during acceleration, a torque force is applied on the rear of the drive axle. Such torque force tends to cause the rear axle to roll backwards on acceleration. The arrangement according to the present invention results in better tire wear because both tires are equally planted to maximize their bite.

The present invention provides a unique concept for increasing acceleration of a racing vehicle or dragster.

What is claimed is:

1. A rear suspension apparatus for a high speed vehicle body having a first and a second driven ground engaging wheel, said apparatus comprising:
    a first truck arm having a first and a second end, said first end of said first arm being connected to the body of the vehicle at a first fixed location;
    a second truck arm having a first and a second extremity, said first extremity of said second arm being connected to the body of the vehicle at a second fixed location;
    a drive axle having a first and a second side, said second end of said first arm being secured adjacent to said first side of said axle, said second extremity of said second arm being secured adjacent to said second side of said axle such that said axle is supported by said arms so that a first plane extending through said first and second sides of said axle is disposed spaced and parallel relative to a second plane extending through said first and said second locations;
    said first truck arm being fabricated from a material having a first hardness; and
    said second truck arm being fabricated from a material having a second hardness such that when the first ground engaging wheel which is drivingly connected to said first side of said axle is driven and the second ground engaging wheel which is drivingly connected to said second side of said axle is driven, a first force tending to increase pressure between the first ground engaging wheel and the ground and a second force tending to decrease pressure between the second ground engaging wheel and the ground is compensated for by a difference in hardness between said first and second hardness of said respective arms the arrangement being such that when the wheels rotate, a first contact force between the first wheel and the ground substantially equals a second contact force between the second wheel and the ground so that acceleration of the vehicle body is enhanced.

2. A rear suspension apparatus as set forth in claim 1 wherein
    said first end of said first arm includes:
    a first spherical bearing for coupling said first end of said first arm to said first location on the high speed vehicle body.

3. A rear suspension apparatus as set forth in claim 1 wherein
    said first end of said first arm includes:
    a first resiliently mounted bushed bearing for coupling said first end of said first arm to said first location on the high speed vehicle body.

4. A rear suspension apparatus as set forth in claim 1 wherein
    said first extremity of said second arm includes:
    a second spherical bearing for coupling said first extremity of said second arm to said second location on the high speed vehicle body.

5. A rear suspension apparatus as set forth in claim 1 wherein
    said first extremity of said second arm includes:
    a second resiliently mounted bushed bearing for coupling said first extremity of said second arm to said second location on the high speed vehicle body.

6. A rear suspension apparatus as set forth in claim 1 wherein
    the high speed vehicle body includes:
    a frame rigidly secured at said first and second locations to said first end and extremity respectively of said first and second arms respectively.

7. A rear suspension apparatus as set forth in claim 1 wherein
    said drive axle includes;
    an axle casing;
    a differential gear assembly disposed between said first and said second sides of said drive axle;
    a first and a second drive shaft extending from said differential gear assembly to the first and second wheels respectively.

8. A rear suspension apparatus as set forth in claim 1 wherein
    said first truck arm includes:
    a first anchor disposed adjacent to said second end of said first arm for securing said second end of said first truck arm to said first side of said drive axle;
    a second anchor disposed adjacent to said second extremity of said second arm for securing said second extremity of said second truck arm to said second side of said drive axle;
    a first spring mounting disposed between said first anchor and said first end of said first arm;
    a second spring mounting disposed between said second anchor and said first extremity of said second arm;
    a first shock absorber bracket disposed adjacent to said first anchor;
    a second shock absorber bracket disposed adjacent to said second anchor.

9. A rear suspension apparatus as set forth in claim 1 further including:
    a first spring extending between said first spring mounting and the vehicle body;
    a second spring extending between said second spring mounting and the vehicle body;
    a first shock absorber extending between said first shock absorber bracket and the vehicle body;
    a second shock absorber extending between said second shock absorber bracket and the vehicle body.

10. A rear suspension apparatus as set forth in claim 1 wherein
said truck arms are fabricated from steel.

11. A rear suspension apparatus as set forth in claim 10 wherein
said first truck arm is fabricated from steel having a first hardness within a first range 60 to 85 on the Rockwell hardness B-scale.

12. A rear suspension apparatus as set forth in claim 11 wherein
said second truck arm is fabricated from steel having a second hardness within a second range 86 to 110 on the Rockwell hardness B-scale.

13. A rear suspension apparatus as set forth in claim 1 wherein
said second hardness is greater than said first hardness so that said second truck arm has greater rigidity than said first truck arm such that during acceleration, said greater rigidity of said second arm counteracts said second force tending to decrease pressure between the second wheel and the ground so that said second contact force between the second wheel and the ground during acceleration substantially equals said first contact force between the first wheel and the ground the arrangement being such that when the wheels rotate during acceleration, such rotation of the wheels equally propels both sides of said drive axle relative to the ground thereby enhancing acceleration of the vehicle body.

14. A rear suspension apparatus as set forth in claim 1 wherein
said second hardness is different from said first hardness so that said second truck arm has a second rigidity which is different from a first rigidity of said first truck arm such that during acceleration, said second rigidity of said second arm counteracts said second force tending to decrease pressure between the second wheel and the ground so that said second contact force between the second wheel and the ground during acceleration substantially equals said first contact force between the first wheel and the ground the arrangement being such that when the wheels rotate during acceleration, such rotation of the wheels equally propels both sides of said drive axle relative to the ground thereby enhancing acceleration of the vehicle body.

15. A rear suspension apparatus for a high speed vehicle body having a first and a second driven ground engaging wheel, said apparatus comprising:
a first truck arm having a first and a second end, said first end of said first arm being connected to the body of the vehicle at a first fixed location;
a second truck arm having a first and a second extremity, said first extremity of said second arm being connected to the body of the vehicle at a second fixed location;
a drive axle having a first and a second side, said second end of said first arm being secured adjacent to said first side of said axle, said second extremity of said second arm being secured adjacent to said second side of said axle such that said axle is supported by said arms so that a first plane extending through said first and second sides of said axle is disposed spaced and parallel relative to a second plane extending through said first and said second locations;
said first truck arm being fabricated from a material having a first hardness;
said second truck arm being fabricated from a material having a second hardness such that when the first ground engaging wheel which is drivingly connected to said first side of said axle is driven and the second ground engaging wheel which is drivingly connected to said second side of said axle is driven, a first force tending to increase pressure between the first ground engaging wheel and the ground and a second force tending to decrease pressure between the second ground engaging wheel and the ground is compensated for by a difference in hardness between said first and second hardness of said respective arms the arrangement being such that when the wheels rotate, a first contact force between the first wheel and the ground substantially equals a second contact force between the second wheel and the ground so that acceleration of the vehicle body is enhanced; and
said second hardness is greater than said first hardness so that said second truck arm has greater rigidity than said first truck arm such that during acceleration, said greater rigidity of said second arm counteracts said second force tending to decrease pressure between the second wheel and the ground so that said second contact force between the second wheel and the ground during acceleration substantially equals said first contact force between the first wheel and the ground the arrangement being such that when the wheels rotate during acceleration, such rotation of the wheels equally propels both sides of said drive axle relative to the ground thereby enhancing acceleration of the vehicle body.

16. A method of making a rear suspension apparatus for a high speed vehicle body having a first and a second driven ground engaging wheel, the method comprising the steps of:
providing a first truck arm having a first and a second end, the first end of the first arm being connected to the body of the vehicle at a first fixed location;
providing a second truck arm having a first and a second extremity, the first extremity of the second arm being connected to the body of the vehicle at a second fixed location;
providing a drive axle having a first and a second side, the second end of the first arm being secured adjacent to the first side of the axle, the second extremity of the second arm being secured adjacent to the second side of the axle such that the axle is supported by the arms so that a first plane extending through the first and second sides of the axle is disposed spaced and parallel relative to a second plane extending through the first and the second locations;
fabricating the first truck arm from a material having a first hardness; and
fabricating the second truck arm from a material having a second hardness such that when the first ground engaging wheel which is drivingly connected to the first side of the axle is driven and the second ground engaging wheel which is drivingly connected to the second side of the axle is driven, a first force tending to increase pressure between the first ground engaging wheel and the ground and a second force tending to decrease pressure between the second ground engaging wheel and the ground is compensated for by a difference in hardness between the first and second hardness of the respective arms the arrangement being such that when the wheels rotate, a first contact force between the first wheel and the ground substantially equals a second contact force between the second wheel and the ground so that acceleration of the vehicle body is enhanced.

* * * * *